E. J. ROBINSON.
Washing-Machine.

No. 163,947. Patented June 1, 1875.

WITNESSES:

INVENTOR:
E. J. Robinson
BY
ATTORNEYS.

THE GRAPHIC CO. PHOTO-LITH. 39 & 41 PARK PLACE, N.Y.

UNITED STATES PATENT OFFICE.

EDWARD J. ROBINSON, OF SCHENECTADY, NEW YORK.

IMPROVEMENT IN WASHING-MACHINES.

Specification forming part of Letters Patent No. 163,947, dated June 1, 1875; application filed April 24, 1875.

*To all whom it may concern:*

Be it known that I, EDWARD J. ROBINSON, of Schenectady, in the county of Schenectady and State of New York, have invented a new and useful Improvement in Washing-Machines, of which the following is a specification.

This invention relates to new and useful improvements in machines for washing clothes; and consists, in combination with a box and a hollow revolving cylinder, of the manner of attaching the journals of the cylinder and securing the same.

Figure 1:
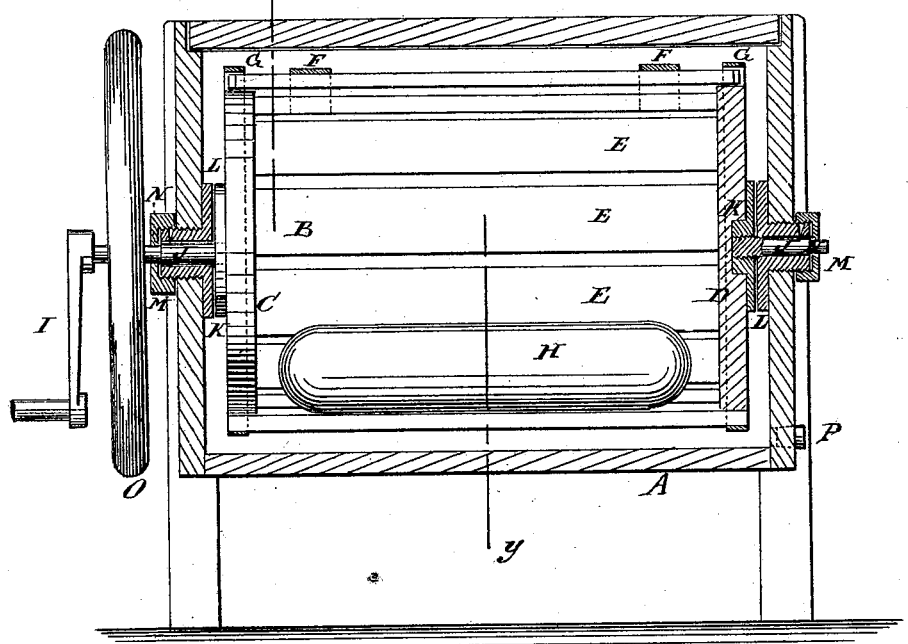
Figure 2:
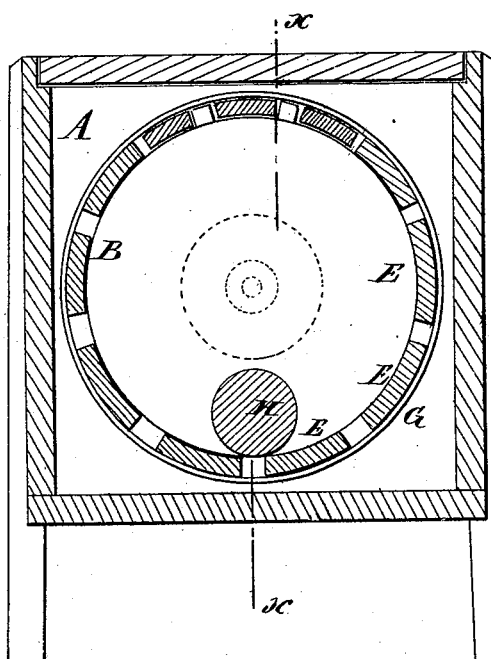

In the accompanying drawing, Figure 1 is a vertical section of the machine, taken on the line $x\ x$. Fig. 2 is a vertical cross-section of Fig. 1, taken on the line $y\ y$.

Similar letters of reference indicate corresponding parts.

A is a water-tight box of rectangular form and suitable size, containing the cylinder B. This cylinder is made with two heads, C and D, united together by slats E. Access to the interior of the cylinder is obtained by means of a sliding door, E′, consisting of three (more or less) of the slats E, which are connected together by the straps F F. This door slides beneath the bands G G on the ends of the cylinder, and is fastened by the friction thus produced. The clothes to be washed are introduced into the cylinder. H is a roller of wood or of any suitable material, which rests on the clothes. This roller is usually from three to four inches in diameter, and is nearly as long as the interior of the cylinder. The cylinder is revolved by means of the crank I on one of the detachable journals J. Water or suds is placed in the box A, so that the clothes are thoroughly wetted at each revolution. K K are flanged plates or disks cut into the ends of the cylinder. The journals J J are screwed into these plates. L L are the journal-boxes, which are screwed into the box A from the inside. $m\ m$ are screw-nuts, through which the journals pass and fit up to the shoulder N N on the journals. The nuts $m\ m$ are secured onto the boxes L L, as seen, and may be removed at any time for the purpose of lubricating the journals or for taking the cylinder from the box. The shoulders N N prevent the journals unscrewing until the nuts are removed, when they may be taken out and the cylinder may be lifted from the box. O is a fly-wheel on one of the journals, which journal is made long for that purpose, and for attaching the crank, as seen in Fig. 1. P is the discharge-plug. This washing-machine is very simple and cheap, and operates to perfection. There is no rubbing or wearing of the clothes, as is done by other machines or by hand.

Having thus described my invention, I claim as new and desire to secure by Letters Patent—

The combination of the detachable journals J, flanged plates K, journal-boxes L, and nuts M with the revolving washing-cylinder B and suds-box A, substantially as herein shown and described, for the purpose specified.

EDWARD J. ROBINSON.

Witnesses:
DANIEL A. ATWELL,
JAMES A. WASHINGTON.